US007843873B2

(12) United States Patent
Tzavidas et al.

(10) Patent No.: US 7,843,873 B2
(45) Date of Patent: Nov. 30, 2010

(54) DYNAMIC COMPENSATION FOR RESOURCE STEALING IN COMMUNICATION SYSTEMS

(75) Inventors: Stavros Tzavidas, Evanston, IL (US); Igor Filipovich, Chicago, IL (US); Rangsan Leelahakriengkrai, Streamwood, IL (US); Ivan N. Vukovic, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 668 days.

(21) Appl. No.: 11/857,545

(22) Filed: Sep. 19, 2007

(65) Prior Publication Data

US 2009/0073934 A1    Mar. 19, 2009

(51) Int. Cl.
*H04W 4/00* (2009.01)
(52) U.S. Cl. .................. 370/329; 370/395.41
(58) Field of Classification Search ............. 370/329, 370/310, 395.4, 395.42, 338; 455/453
See application file for complete search history.

(56) References Cited

U.S. PATENT DOCUMENTS

| 2003/0198204 | A1  | 10/2003 | Taneja et al. |
| 2007/0047553 | A1* | 3/2007  | Matusz et al. ........... 370/395.42 |
| 2007/0097936 | A1* | 5/2007  | Lee et al. .................... 370/338 |
| 2007/0133556 | A1* | 6/2007  | Ding et al. ............... 370/395.4 |
| 2007/0201399 | A1* | 8/2007  | Lee et al. .................... 370/329 |
| 2007/0206545 | A1  | 9/2007  | Lee et al. |
| 2008/0151794 | A1* | 6/2008  | Moilanen .................... 370/310 |
| 2010/0022252 | A1* | 1/2010  | Cavalli et al. ............... 455/453 |

FOREIGN PATENT DOCUMENTS

WO     2005069514 A1     7/2005

OTHER PUBLICATIONS

Chandra, S. et al.: 'An Efficient Call Admission Control for IEEE 802.16 Networks'; Local & Metropolitan Area Networks, 2007, LANMAN 2007, 15th IEEE Workshop on Jun. 10-13, 2007, pp. 188-193.
Ching Yao Huang et al.: 'Radio resource management of hetrerogeneous services in mobile WiMAX systems'; Wireless Communications, IEEE [see also IEEE Personal Communications], vol. 14, Issue 1, Feb. 2007, pp. 20-26.

* cited by examiner

*Primary Examiner*—Albert T Chou (57) ABSTRACT

A scheduler associated with a base station of a wireless communication network dynamically compensates for uplink bandwidth that has been re-assigned (stolen) by a mobile station (MS) to transmit a control message. The scheduler allocates a preset amount of bandwidth to the MS for data transmission. The scheduler detects bandwidth stealing activity and evaluates when bandwidth stealing is justified on he part of the MS. The scheduler provides additional bandwidth to appropriately compensate for the stolen bandwidth when bandwidth stealing is justified, in order to maintain the quality of service of the data traffic connection.

21 Claims, 7 Drawing Sheets

DYNAMIC COMPENSATION FOR RESOURCE STEALING IN COMMUNICATION SYSTEMS

BACKGROUND

1. Technical Field

The present invention relates generally to resource allocation for communication systems, and in particular to resource stealing within communication systems. Still more particularly, present invention relates to allocation of resources in communication systems with resource stealing.

2. Description of the Related Art

In cellular technologies, uplink bandwidth is assigned by the scheduler at the Base Station (BS) on a per mobile station (MS) basis. Typically, the scheduler allocates uplink bandwidth (UL BW) using over the air (OTA) signaling to various mobile stations (MSs) based on the connections the mobile stations have established. A particular MS may have multiple uplink connections, and depending on the parameters of each connection, the MS will receive uplink bandwidth assignments/allocations for each of the connections. However, even though the decision to allocate bandwidth to a specific MS is related to the requirements of a specific uplink connection, the bandwidth allocation in some technologies is given generally to the MS, as a whole, and not on a per connection basis. That is, the over the air (OTA) signaling provides no indication of which connection each uplink bandwidth allocation is intended for, and the MS can utilize the bandwidth allocation in any way desired by the MS. The mobile station is thus able to and may occasionally utilize the bandwidth for a purpose different than what the scheduler intended. For example, the MS may occasionally utilize bandwidth allocated for uplink data to transmit other type of information, e.g., control messages. The uplink data allocation may then be utilized to send (1) data for the intended connection, (2) data for another connection, (3) a control message, or (4) a combination of 1 through 3.

This process of re-assigning bandwidth to a transmission that is different than what the bandwidth was intended for is referred to herein as bandwidth "stealing". As is known in the art, bandwidth stealing behavior occurs within the context of the 802.16e (and 802.16d) standards (commonly referred to in the industry as WiMAX). However, stealing of resources is not limited to WiMAX communication systems, and such stealing may also occur in other communication systems with a resource scheduler coordinating scheduling of limited resource to a plurality of communicating entities/devices.

When bandwidth is stolen, bandwidth for the intended application (data transmission) is lost. This loss of bandwidth may be justified in some instances, such as when the bandwidth is re-assigned to send urgent uplink control messages, for example. However, the loss leads to performance penalties including increased latency/delays in transfer of the application data.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The embodiments described herein provides a scheduler (associated with the base station of a wireless communication system/network) that dynamically compensates for uplink bandwidth that has been re-assigned (stolen) by a mobile station (MS) to transmit a specific type of control message or for utilization by a type of connection. The type of control message and/or type of connection are pre-designated/pre-defined within the scheduler as control messages/connections for which bandwidth "stealing" is justified. The scheduler allocates a preset amount of bandwidth to the MS for data transmission. The scheduler (or an associated algorithm) detects bandwidth stealing activity and evaluates when bandwidth "stealing" is justified on the part of the MS. When bandwidth stealing is justified, the scheduler decides if compensation is needed for the stolen bandwidth, and if compensation is needed, the scheduler appropriately compensates for the stolen bandwidth in order to maintain the quality of service of the data traffic connections.

The illustrated and described embodiments focus on uplink bandwidth stealing within a wireless communication system having a base station and mobile stations. However, the functionality provided by the invention is equally applicable to any communication system in which there is a scheduling entity and other communicating entities, where the scheduling entity performs the role of coordinating communication and assigning/allocating resources to the various other entities, where the other entities may "steal" portions of the allocated resources for communicating information other than the information the resource was allocated for. The specific embodiments described herein are merely for illustration and to provide concrete implementation scenarios/examples of the functional features of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention.

The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
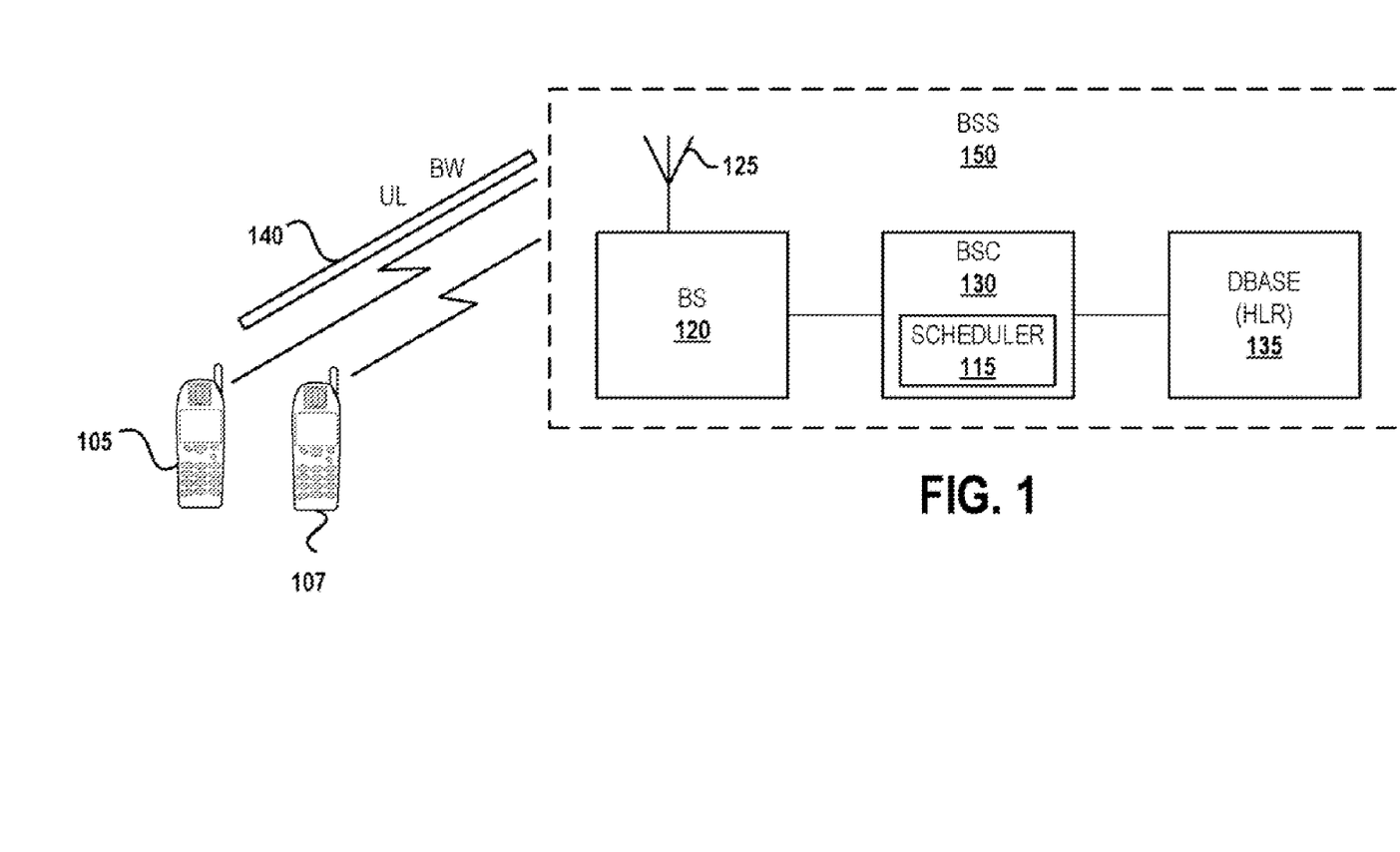
FIG. 1 illustrates an example communication network with a base station and mobile stations that are allocated uplink bandwidth, in accordance with one embodiment of the invention.

With reference now to the figures, and in particular FIG. 1, there is illustrated an example wireless communication network within which the features of the described embodiments are implemented. As shown, wireless communication system 100 comprises a Base Station Subsystem (BSS) 150, which comprises a base station (BS) 120, having a base station antenna 125, and a base station controller (BSC) 130. BSC 130 is the processing component of BSS 150 and includes a scheduler 115. Also, BSC 130 is coupled to a database (DBASE) 135. DBASE 135 may include a Home Location Register (HLR) or a Visited Location Register (VLR), or a combination of a HLR and VLR, or a similar data structure. DBASE 135 enables scheduler 115 to uniquely identify/track which mobile stations are connected to BSS 150, the associated connections per mobile station, and the corresponding operating parameters, including rules related to uplink bandwidth allocation, supported for the respective mobile stations. It should be noted that the different components of BSS shown in FIG. 1 are shown here simply as an example and for clarity of presentation. In a real implementation of the invention, each or all of the shown components can be combined with another or a plurality of other components, or can represent different physical components, without loss of generality. For example, the BSC is not necessarily a different physical/logical entity, but can be collocated with/within the BS, in alternate implementations.

In addition to BSS 150 and associated components, wireless communication network 100 comprises one or more mobile stations (MS), of which mobile station (MS) 105 and MS 107 are illustrated. BSC 130 manages the wireless air interface with each MS 105, 107. Both MSs 105, 107 are in wireless communication with BSS 150, and BSS 150 provides wireless communication services to the mobile stations (MSs) 105, 107 via one or several available access protocols. Also, MSs 105 and 107 and BSS 150 are configured to support one or more wireless standards, including the 802.16e and 806.16d standards (commonly referred to as WiMAX). Wireless communication between the BSS 150 and MSs 105 and 107 is taking place via over-the-air (OTA) signals using bandwidth allocated to MSs 105, 107 by scheduler 115, as described in greater detail below. A single uplink (UL) 140 is illustrated traversing (virtually) the wireless link between MS 105 and base station antenna 125, as an example.

Communication network 100 supports any number of MSs. Each MS 105, 107 may be any type of communication device including but not limited to cellular telephones, radio telephones, text messaging devices, handheld computers, pagers, beepers, mobile or non-mobile user equipment, set-top boxes or other sorts of customer premises equipment, or the like.

Figure 2:
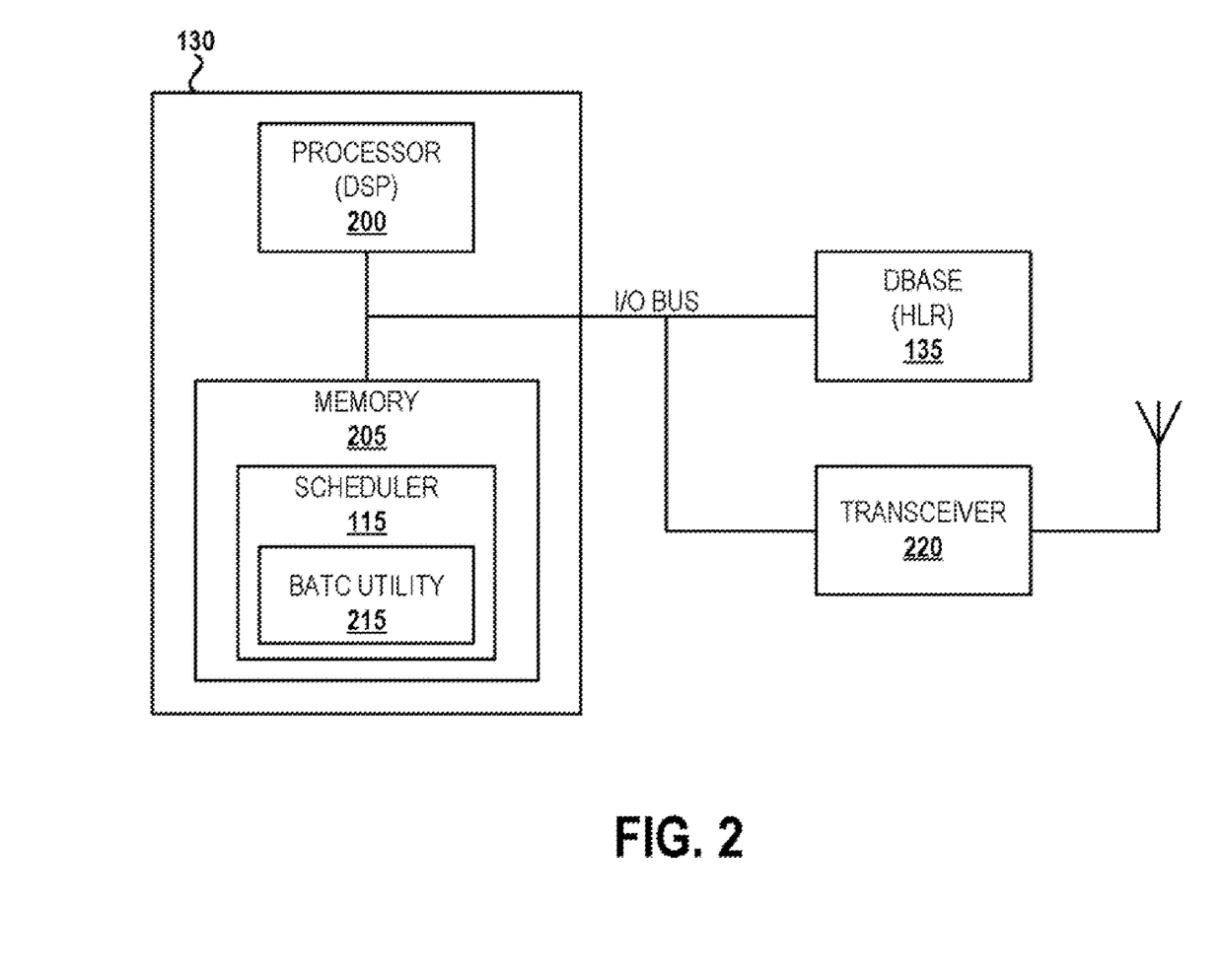
FIG. 2 is a block diagram of an example processing component of a base station subsystem, which includes a scheduler utilized to provide bandwidth allocation and compensation in accordance with one embodiment of the invention.

Referring now to FIG. 2, there is illustrated an example BSC 130 with the basic components required for enabling the features of the described embodiments. As shown, BSC 130 comprises a processor 200, which may include one or more or combinations of microprocessors, microcontrollers, and/or digital signal processors. BSC 130 also comprises an associated memory 205 that is coupled to processor 200 via a system bus. Memory 205 may be random access memory (RAM), dynamic random access memory (DRAM), and/or read only memory (ROM), or equivalents thereof, that store data that may be used by and programs that may be executed by processor 200.

BSC 130 is illustrated with several additional components coupled to an I/O bus, including DBASE 135 and a transceiver 220 (which may be a separate transmitter-receiver pair), such as BS 120, that enables digital-to-analog and analog-to-digital signal conversion as required during wireless communication (reception or transmission) between BSS 150 in which BCS 130 operates and an external device, such as MS 105. These additional components may or may not be directly connected components of BSC 130, in other embodiments.

In the illustrated embodiment, memory 205 includes scheduler 115. Scheduler 115 includes enhanced logic (hardware, firmware or software utility) to enable bandwidth compensation features described herein. Specifically, as shown by FIG. 2, scheduler 115 comprises a bandwidth allocation, tracking and compensation (BATC) utility 215, which is an algorithm that executes on processor 200 and enables scheduler 115 (or BSC 130) to perform a plurality of processes. These processes include but are not limited to the following: (1) allocating an initial amount of bandwidth to a MS; (2) detecting utilization by the MS of a portion of the allocated bandwidth to upload a control message (or upload data for another connection); (3) determining when bandwidth stealing is justified (e.g., when the control message is one of a pre-defined type of control message); (4) determining if compensation is desired for the justified stealing; and (5) responding to justified stealing of bandwidth, if compensation is desired, by dynamically allocating additional (make-up) bandwidth to the mobile station.

With the above configurations of communication network 100 and BSC 130, bandwidth allocation, bandwidth stealing and bandwidth compensation processes are provided in accordance with the embodiments described herein. In the described embodiment, BSC 130, having software programs executing therein, performs the functions of scheduler 115. In one embodiment, the functionality of the scheduler 115 is provided separate from that of BATC utility 215, which may be provided as an off-the-shelf enhancement to an existing scheduler.

Those of ordinary skill in the art will appreciate that the hardware depicted in FIGS. 1 and 2 may vary. For example, other devices/components also may be used in addition to or in place of or in a different configuration than the hardware/firmware/software depicted. Thus, the depicted examples are not meant to imply architectural or other limitations with respect to the present invention.

As described herein, the embodiments provide selective bandwidth compensation for particular types of uplink bandwidth stealing by the MS when the MS utilizes an uplink bandwidth allocation that was originally intended for data traffic to send other information, such as uplink control messages. When this "stealing" activity is detected by a scheduler, such as scheduler 115, the scheduler interprets the reassignment of the bandwidth as a "greedy" behavior (i.e., attempting to utilize more bandwidth than allocated) on the part of the MS. However, as further provided by the embodiments, the scheduler is programmed to recognize that this stealing may be a reasonable measure to forward certain types of data or control messages (or generally certain types of information) to the BS more quickly. The scheduler thus monitors for and responds to such incidents of uplink bandwidth stealing, where appropriate, in order to compensate, if desired, for at least the amount of bandwidth that the control message occupied during justified bandwidth stealing.

Because the MS's action of stealing bandwidth is not always justified, a mechanism is provided to identify when the stolen bandwidth should be compensated for. In one embodiment, a BATC utility, such as BATC utility 215, executing as a part of the scheduler's functions, detects bandwidth stealing activity, evaluates when bandwidth "stealing" is justified on the part of the MS, further determines if compensation is desired in case of justified stealing, and appropriately compensates for the stolen bandwidth, when desired, for instances that are justified.

The described embodiments allow for such bandwidth compensation only in a limited number of cases, based on pre-established but configurable conditions/rules. In one embodiment of the invention, compensation for lost bandwidth is "justified" when some part or all of the assigned bandwidth is used to send an "urgent" control message. The types of control messages for which bandwidth stealing is considered justified are pre-established/pre-defined and stored within a list or data store (e.g., DBASE 135). Included within this list are one or more of:

(a) MOB-SCN_REPORT: This first type of control message is used by the MS to report the channel conditions with regard to the BSs to which the MS is connected, or which the MS monitors periodically (without being connected), and the first control message is generated when a specific trigger is met. When the trigger is met the MS is required to send a report to the BS as soon as possible; and (b) MOB-MSHO_REQ/RSP: This second type of control message is a handover management message, which is used by the MS to request that the MS's connections be transferred to a BS that is different than the BS the MS is currently connected to, because of deteriorating signal conditions. This second control message and related messages are urgent in nature since any added delays may lead to handover failure or fast signal degradation.

When one of the above types of control messages are detected, the scheduler is preprogrammed to provide "make-up" bandwidth to the particular MS. The first type of control message is generated when the MS determines that specific conditions (referred to as "Handover triggers" in the 802.16e standard) are met. During operation, the MS monitors the signal strength of the neighboring BSs to determine if the conditions for generating the MOB-SCN_REPORT message are met. When the conditions are met, the MS is expected to send a MOB-SCN_REPORT message to the serving BS to report on the event, as soon as possible. The MOB-SCN_REPORT message is therefore urgent in nature and bandwidth stealing is justified, in order to ensure timely delivery of the message.

In addition to the MOB-SCN_REPORT message, handover management messages are also important (and often urgent) and stealing of uplink bandwidth for these handover management messages would also be justified on the part of the MS. Other types of control or other messages may be pre-defined for similar treatment when provided on uplink bandwidth that is originally intended for data transmission.

The control message examples provided above are in the context of a specific technology. Those skilled in the art will recognize that similar messages for similar purposes exist in other communication technologies. Those skilled in the art will further recognize that this list can be expanded to include any type of control messages that are defined as urgent (to the BS's discretion) without limiting the scope of the invention.

In other embodiments, bandwidth stealing and subsequent compensation is deemed "justified" based on a number of additional criteria. These additional criteria include, for example: (a) when the current load is low, whereby greedy behavior from the MS can be acceptable under low load conditions; (b) whether the stealing occurs for a higher priority stream that may be pre-defined as urgent. Examples of instances of urgent or higher priority data stream include streams for VoIP (Voice over Internet Protocol) transmission or video transmission and TCP and/or ARQ acknowledgment messages.

In many technologies, the concept of "scheduling service" is utilized. For each connection the scheduler specifies the rules according to which bandwidth will be provided, as part of the normal operation. For example, depending on the needs of a specific connection, the scheduler may declare the connection to be of type Unsolicited Grant Service (UGS), in which uplink bandwidth allocations are provided in periodic intervals without the need of additional bandwidth requests on the part of the MS. As another example, a connection may be deemed to be of scheduling service Best Effort (BE), in which case bandwidth is provided only when requested by the MS and with no particular schedule of pattern. In other words, in a BE service, the MS has to explicitly issue a request to the scheduler for every bandwidth allocation that is needed. The present invention applies regardless of the bandwidth allocation scheme (or scheduling service) of a connection.

One embodiment of the present invention factors in the scheduling service of the connection from which the bandwidth is stolen in determining if bandwidth stealing is justified. In one such embodiment, bandwidth stealing can be deemed as justified when stealing from low priority scheduling services. For example, in one implementation, there is no "make up" bandwidth provided for bandwidth stolen from an Unsolicited Grant Service (UGS) connection, since this type of connection is normally deemed of the highest priority. However, the scheduler provides "make up" bandwidth for bandwidth that is stolen from a lower priority connection (e.g., a BE connection) to send data belonging to a higher priority connection.

In another embodiment of the present invention, bandwidth stealing from BE services may be considered justified up to a threshold percentage or ratio (e.g., every k out of m times), where the scheduler maintains a log of the number of times bandwidth stealing occurs from BE services and caps the compensation to not exceed k times out of every m occurrences. That is, the scheduler determines a ratio of a number of times resource stealing has occurred for the first stream relative to a total number of received resource blocks and, when the ratio is below a preset threshold ratio, provides the additional resource allocation, wherein compensation for resource stealing by the first stream is capped to not exceed the preset threshold ratio. In yet another embodiment of the present invention, bandwidth stealing may be justified if certain important sub-headers or extended sub-headers need to be sent. These may be sent according to the discretion of the MS, and the scheduler maintains a method for determining when such bandwidth stealing is compensated.

Figure 3:
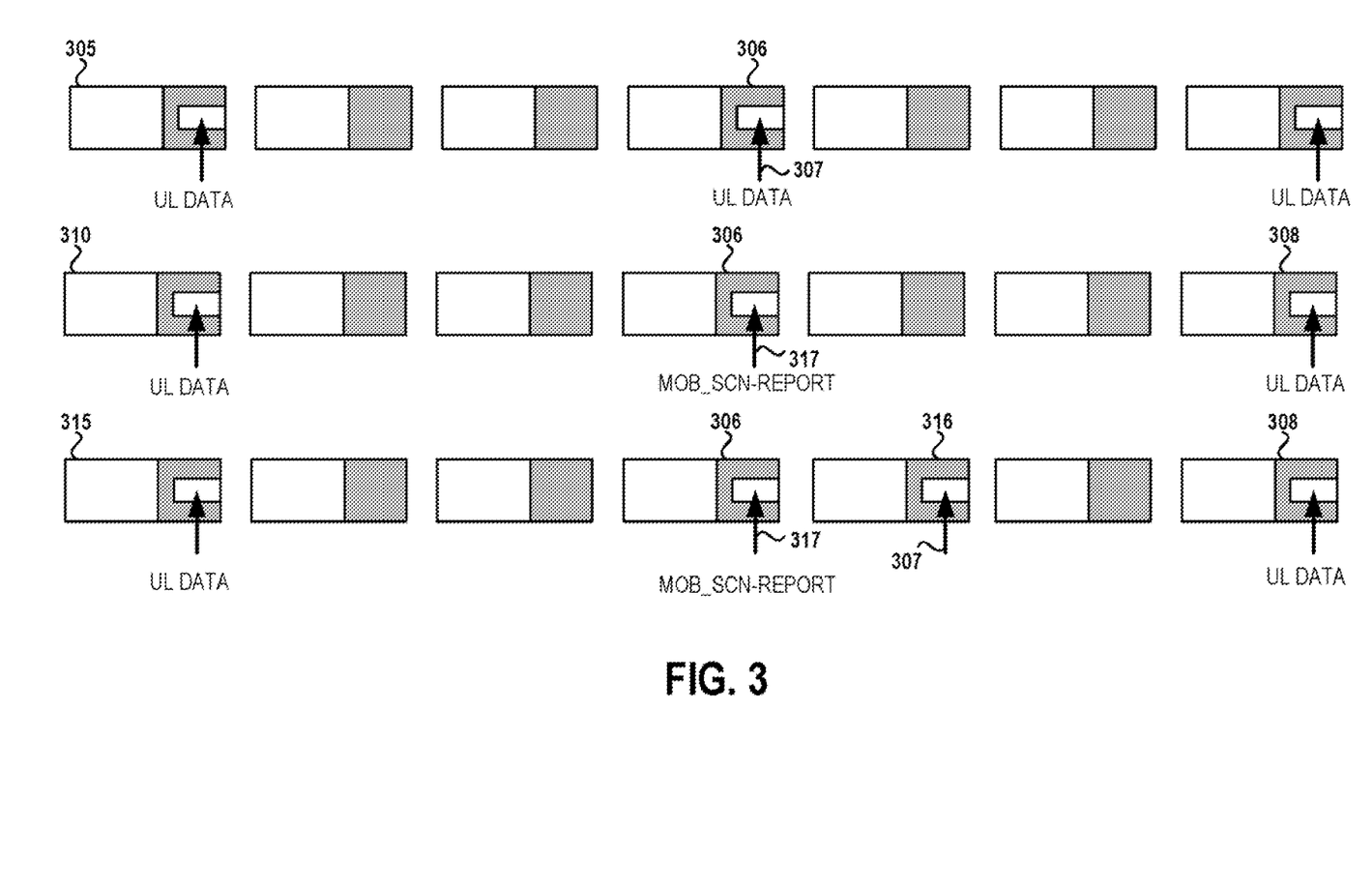
FIG. 3 illustrates a sequence of bandwidth allocations for data uplink and the inclusion of make up bandwidth to compensate re-assignment of one of the allocations for non-data transmission in accordance with an embodiment of the invention.

FIG. 3 illustrates an example of the utilization of available uplink bandwidth to transmit data and other information from the MS perspective. In FIG. 3, three sequences of frames 305, 310, 315 are provided to illustrate bandwidth grants in accordance with embodiments of the present invention. A first sequence 305 of the three sequences is a standard/normal sequence in which only uplink data is transmitted on the uplink bandwidth. As shown in FIG. 3, in this example, the normal bandwidth grants are periodic, with a bandwidth grant provided each period for data uplink. A second sequence 310 of the three sequences illustrates re-assignment of one grant (306) of the uplink bandwidth to MOB-SCN_REPORT control message 317. Finally, a third sequence 315 of the three sequences illustrates the utilization of additional "make-up" uplink bandwidth to compensate for the uplink bandwidth re-assigned to the control message 317.

As shown in first frame sequence 305, an MS has one UGS connection established with a base station. The connection allows the scheduler to send periodic uplink bandwidth grants (i.e., allocate uplink bandwidth) to the MS. As indicated by the first frame sequence 305, the grants are represented as individual grants 306 of allocated bandwidth within which the scheduler expects, and the MS typically inserts, uplink data 307. In the second frame sequence 310, the MS has a control message to transmit. In such an instance, the MS assigns the control message to one of the bandwidth grants 306 in the uplink bandwidth originally allocated for uplink data 307. As shown by the illustration, the control message 317 is a MOB_SCN-REPORT, which is one of the pre-established control message types for which bandwidth stealing is justified. The scheduler detects the use of the granted uplink bandwidth 306 to transmit the control message 317, and the scheduler determines if the control message 317 falls into a pre-established category/type of control messages for which the MS is permitted to "steal" bandwidth. When the control message falls into the pre-established category/type, the scheduler immediately provides an additional, make-up bandwidth grant 316 to the MS to compensate for the re-assigned/stolen bandwidth, as depicted in the third frame sequence 315. The additional grant 316 is then allocated to the uplink data 307 that was displaced by the control message 317. Assuming the make-up bandwidth 316 is provided before the next regularly scheduled grant, the displaced uplink data 307 is forwarded within the make-up bandwidth. Notably, when the control message 317 is not one of the pre-established types of messages, then the uplink data is transmitted on the next grant 308 and all subsequent uplink data transmissions are delayed by one grant cycle.

Figure 4:
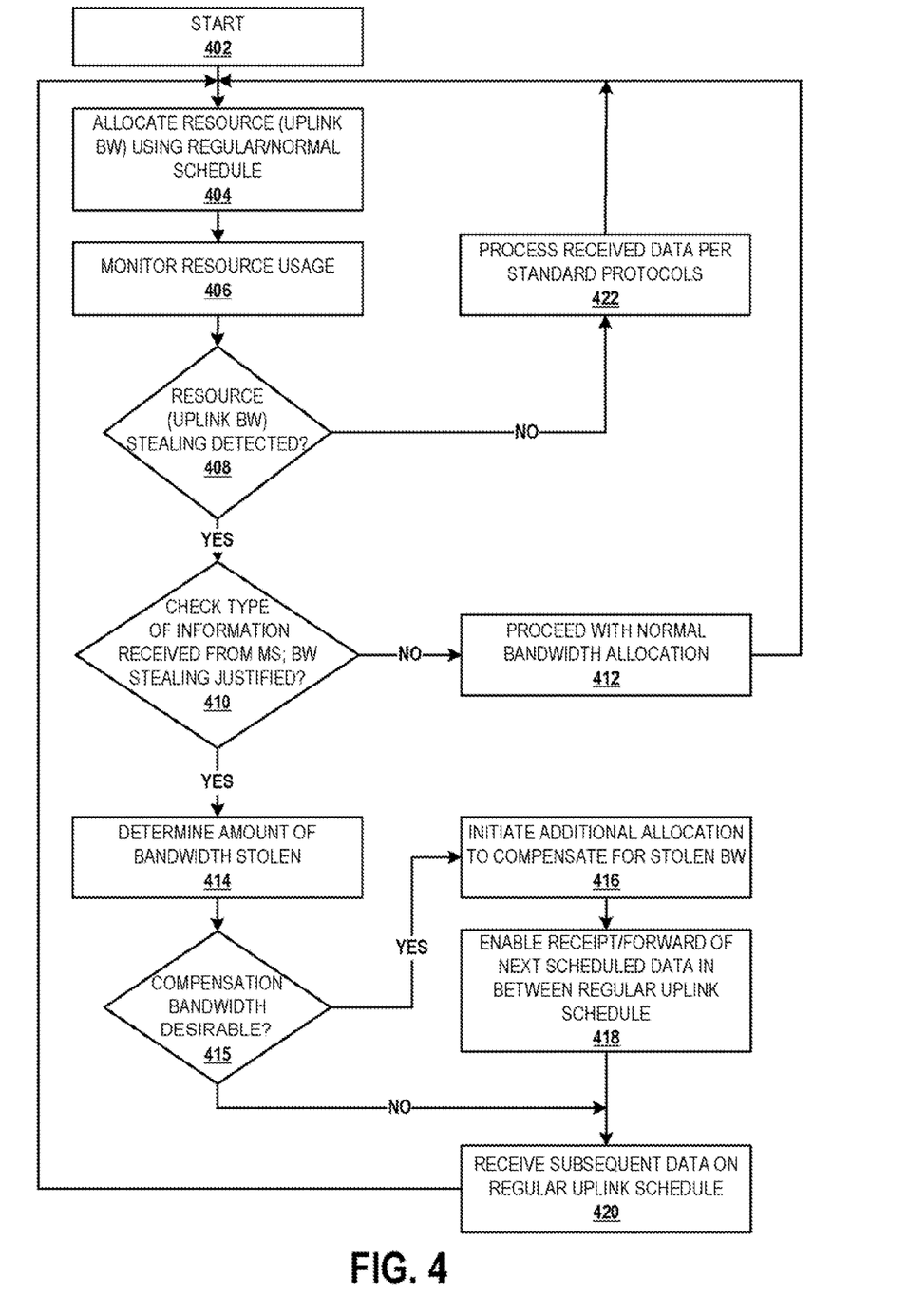
FIG. 4 is a flow chart illustrating the process/method by which the scheduler performs bandwidth allocation and compensation in accordance with one embodiment of the invention.

FIG. 4 is a flow chart illustrating the method by which the above processes that enable dynamic compensation for bandwidth stealing are completed according to embodiments of the invention. The method illustrated in FIG. 4 is described with reference to components shown in FIGS. 1-2, specifically scheduler 115 and MS 105; however, it should be understood that references to these figures is merely for illustration and that alternative representations of the components and/or functions illustrated by FIGS. 1-2 can be employed when implementing the various methods. Key portions of the methods may be completed by scheduler 115 or BATC utility 215 executing within BSC 130, while other portions may be supported by data uplink scheduling functions of an MS 105, 107. The method of FIG. 4 is thus described from the perspective of scheduler 115 and/or BATC utility 215 executing on BSC 130. For general application, references to uplink bandwidth may refer to other resources, and the figure represents uplink bandwidth as the example "resource" being allocated and monitored.

The process begins at start block 402 and proceeds to block 404 at which the scheduler allocates uplink resources, or bandwidth, to the MS at the regular schedule. The scheduler monitors the uplink bandwidth channel and the specific use of the uplink bandwidth by the MS, as shown at block 406. At decision block 408, the scheduler determines whether uplink bandwidth stealing is detected, that is, determines whether a different type of information has been received within the resources that were allocated to the MS, other than a first type of information that the resources were originally allocated to transmit. If no uplink bandwidth stealing is detected, the received uplink data is processed according to standard protocols, as indicated at block 422, and the scheduler continues with the process of allocating uplink bandwidth to the MS for data uplink according to established bandwidth allocation scheduling.

However, if at decision block 408, the scheduler detects uplink bandwidth stealing, that is, detects resource stealing within the received resource block allocated to the MS, the scheduler checks the type of information received from the MS on the uplink bandwidth and determines, at block 410, whether the bandwidth stealing was justified. As used herein, the term resource block refers to the resources that have been allocated to a particular user at a certain point in time, and within which resource stealing can occur. Further, as provided herein, determining whether bandwidth stealing is justified involves comparing a type (some identifying characteristic) of the information received against a list of "pre-defined" types of information (such as control messages) or by applying a set of criteria which define when bandwidth stealing is "deemed" to be justified. If the bandwidth stealing is not justified, the scheduler proceeds with a normal allocation schedule for providing bandwidth to the MS, as shown at block 412. In one embodiment, the scheduler may also adjust its data receiving functions to account for the delay in receipt of the next in-sequence ("sequential") data packet from the MS.

As shown by the flow chart, the scheduler detects uplink bandwidth stealing when a specific MS utilizes bandwidth, which was originally intended for data traffic of a specific connection, to send a control message or data for another connection or other type of information. According to one implementation, the scheduler decides if make-up bandwidth is desirable based on the type of control message that is received. For example, the first type of control message is urgent in nature and justifies the stealing of the uplink bandwidth by the MS. Bandwidth stealing is pre-defined as being justified for these first-type (urgent) control messages. According to one embodiment, the control message may occupy the entire/whole bandwidth allocation, or at least a part of bandwidth allocation. That is, the control message may be sent in conjunction with a data packet. The scheduler thus decides if additional bandwidth (referred to herein as "make-up bandwidth") should be allocated to the MS to compensate for the bandwidth of the uplink occupied by the control message. Other embodiments are described below in which other types of bandwidth stealing are generally defined as justifiable, such as the assignment to higher priority connection data.

Returning to decision block 410, if the type of control message included within the stolen uplink bandwidth is determined to be one of the pre-established types of information (e.g., control messages or connections) for which bandwidth stealing is justified, then the scheduler checks the amount of bandwidth stolen, as shown at block 414. The scheduler then determines, at block 415, whether compensation bandwidth is desirable in order to reduce latency. A determination of when compensation bandwidth is desirable may be up to a designer of communication system 100, and more specifically may depend upon numerous factors such as a type of the uplink data, a tolerance for a delay or even a loss of the data, a time of day, system loading, a delay budget, and other factors that may occur to one of ordinary skill in the art. This check is performed because not every instance of justified bandwidth stealing requires an allocation of compensation bandwidth. If compensation bandwidth is desirable, the scheduler automatically allocates to the MS additional resources to replace previously allocated resources that were stolen, that is, allocates an additional amount of bandwidth equal to (or greater than) the amount of bandwidth that was stolen by the control message, as shown at block 416.

The compensation bandwidth may be provided in one or more chunks, and may be provided before or after the next normal allocation (for UGS connection, for example). In one embodiment, the additional bandwidth is provided mid-sequence, to enable transmission of the originally scheduled data as close as possible to the time the data would have originally been transmitted had the bandwidth not been re-assigned to the other information. Those skilled in the art appreciate that there may not be a next scheduled allocation for connections that are not provided periodic uplink allocations. Further a "normal" allocation schedule may be periodic or non-periodic, static or dynamic, and may not follow any discernible pattern. The compensation bandwidth may thus be provided independent of any normal allocation schedule.

Once make-up bandwidth is allocated, the scheduler also prepares for mid-sequence receipt of the uplink data on the additional, make-up bandwidth, as shown at block 418. With the make-up bandwidth allocated to the MS, the scheduler continues with regular/normal allocations and prepares for receipt of subsequent data on the regular data uplink schedule/pattern, as provided at block 420.

In one implementation, allocation of the additional "make-up" bandwidth is provided with high priority to the specific MS, so that the MS may quickly respond by sending the scheduled data whose bandwidth grant was re-assigned as soon as possible within the make-up bandwidth. By tagging the make-up bandwidth as a high priority grant, substantial delays in data propagation due to bandwidth stealing may be avoided.

In the flow chart above, the method may be embodied in a computer readable medium containing computer readable code such that a series of steps are performed when the computer readable code is executed on a computing device (e.g., BSC 130). In some implementations, certain steps of the methods are combined, performed simultaneously or in a different order, or perhaps omitted, without deviating from the spirit and scope of the invention. Thus, while the method is described and illustrated in a particular sequence, use of a specific sequence is not meant to imply any limitations on the invention. Changes may be made with regards to the sequence without departing from the spirit or scope of the present invention. Use of a particular sequence is therefore, not to be taken in a limiting sense, and the scope of the present invention is defined only by the appended claims.

One embodiment of the present invention provides an algorithm for the scheduler to evaluate instances that requires bandwidth compensation. The algorithm appropriately compensates for bandwidth loss and enables fair use of uplink bandwidth, which minimizes penalty to MSs. The features of the invention are applicable to real-time traffic, such as Voice over Internet Protocol (VoIP) and gaming applications. With these types of applications, the UGS connection that the scheduler maintains provides uplink bandwidth allocations in regular intervals, for example, one uplink bandwidth every 20 milliseconds (msecs). Also, each application is provided a delay budget (e.g., 50 msec for VoIP and 35 msec for gaming). Without bandwidth compensation, as provided by the described embodiments herein, subsequent data frames are delayed by at least the regular time interval, which represents 40% and 57% of the total delay budgets for VoIP and gaming applications, respectively.

The scheduler determines how to "make up" the bandwidth loss. When "justified" bandwidth compensation is desired, the scheduler provides "make up" bandwidth in subsequent frames. The make-up bandwidth is not factored in the normal scheduling algorithm for the specific MS connection. Finally, the "make up" bandwidth will receive higher priority in scheduling so that data that is queued at the MS side is not substantially delayed beyond the initial delay period.

Figure 5:
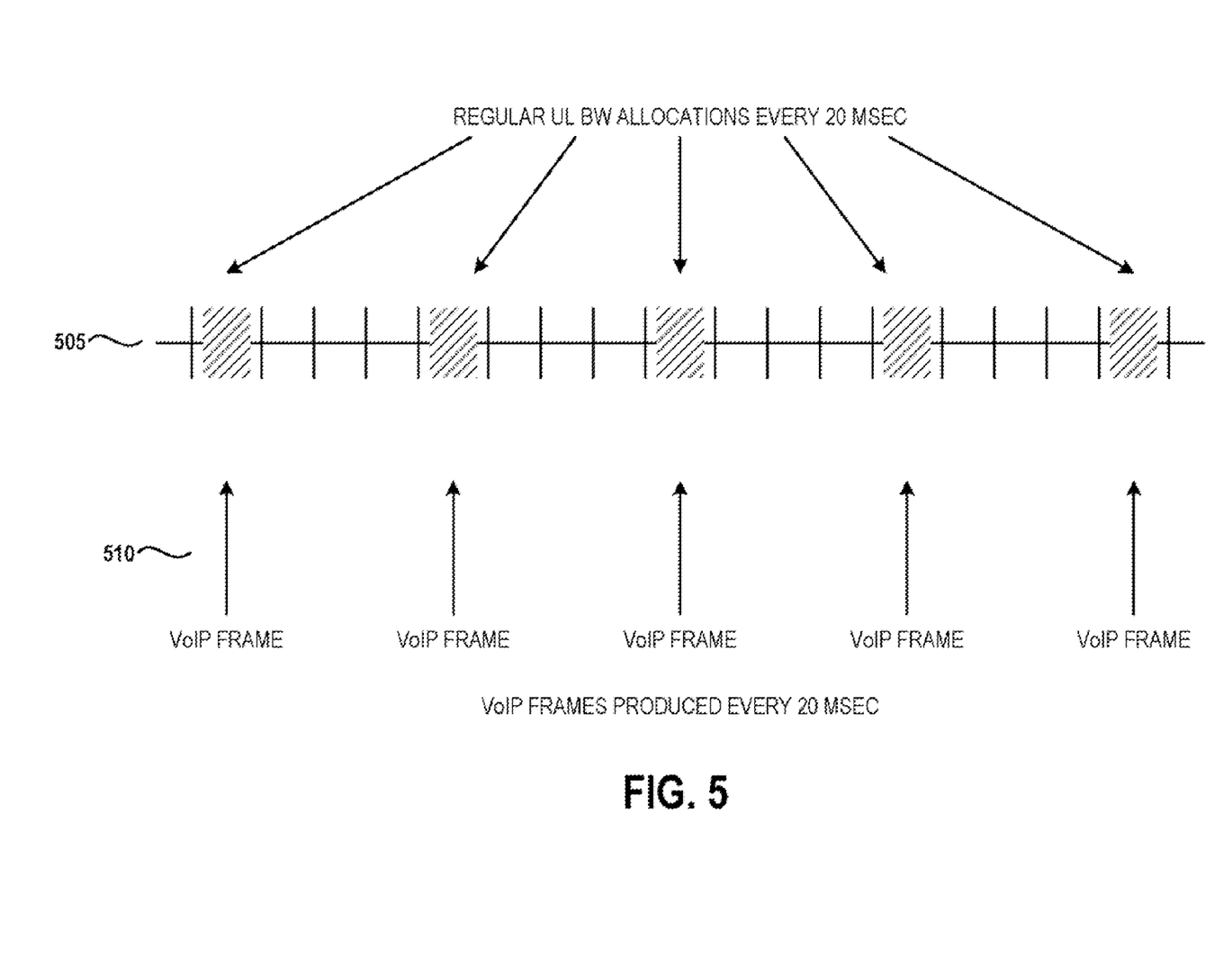
FIGS. 5-6 provide examples of a real time flow for assigning uplink bandwidth with periodic bandwidth allocations for VoIP frames and non-justified bandwidth stealing in accordance with one implementation embodiment of the invention.
Figure 6:
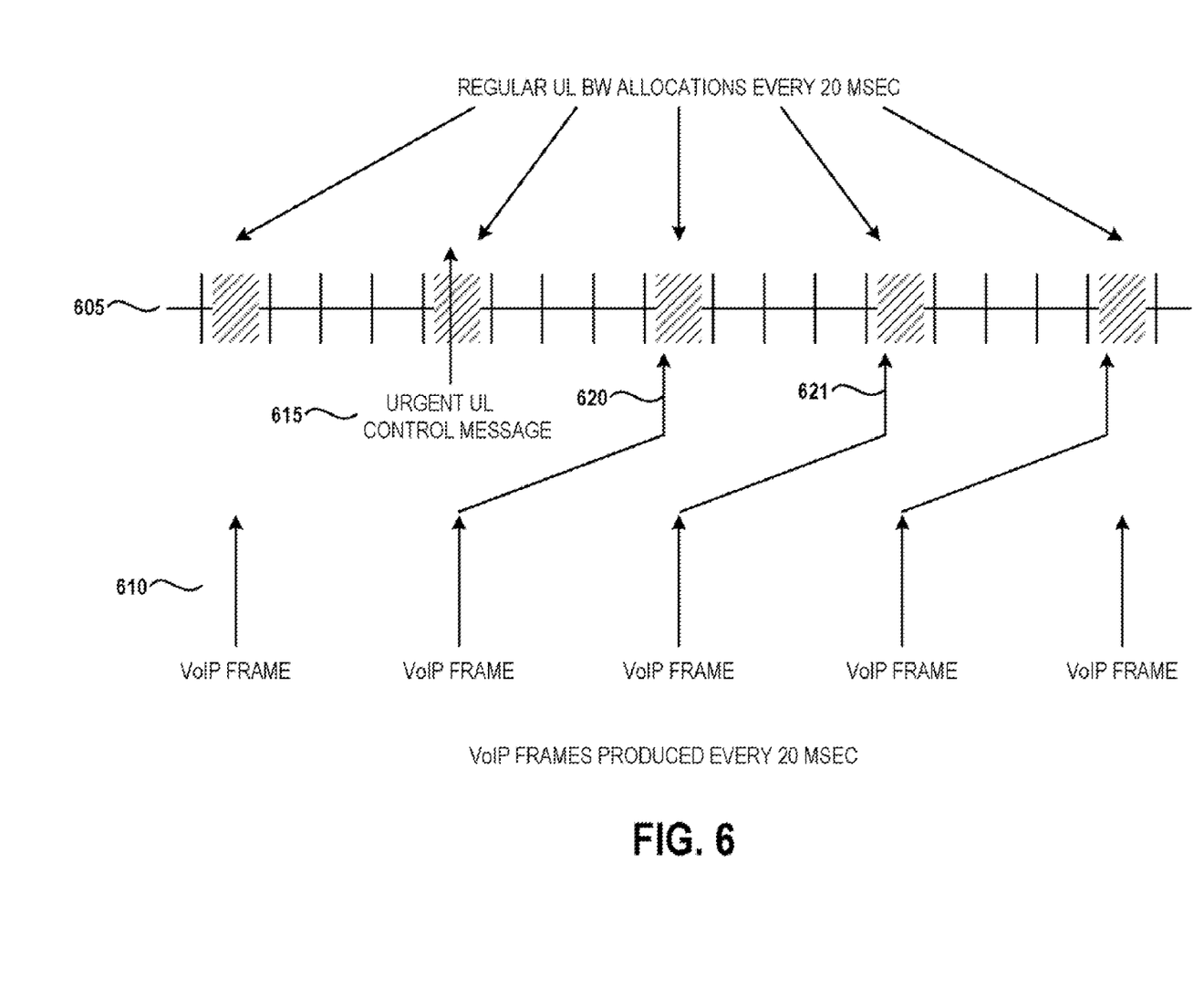

FIGS. 5 and 6 illustrate the conventional bandwidth allocation and data uplink cycles for an example VoIP communication. According to FIGS. 5 and 6, VoIP data frames 510/610 are produced every 20 msecs, and uplink bandwidth allocations 505/605 are provided on a 20 msec cycle in real-time flow. With the cycles coordinated accordingly, an exact amount of bandwidth is allocated by the scheduler to accommodate the VoIP data upload.

The scheduler provides the regular Unsolicited Grant Service (UGS) by which uplink bandwidth allocations are provided to the MS in regular intervals. As provided, the scheduler provides one uplink bandwidth allocation every 20 msec. The uplink protocol supports or defines a delay budget for each packet. With VoIP, the delay budget is 50 msec. In other implementations the delay budget can be higher or lower, e.g., with gaming, the delay budget is typically 35 msec.

FIG. 6 provides an example of the utilization at the MS of allocated bandwidth, when no bandwidth compensation is provided by the scheduler. As with FIG. 5, the MS has one UGS connection established. The scheduler sends periodic uplink bandwidth grants to the MS, intended for uplink data. The MS may utilize a portion of the uplink allocation to send data for another connection (e.g., a lower priority connection). The scheduler does not detect a bandwidth compensation scenario and does not provide any "make up" bandwidth, thus delaying upload of the scheduled data and leading to performance degradation.

When bandwidth stealing occurs in conventional systems, as illustrated by FIG. 6, the MS and scheduler respond to the stealing of a bandwidth slot by simply sending the scheduled data on the next available bandwidth slot, one cycle (i.e., 20 msec) later than initially scheduled. The urgent control message 615 occupies the bandwidth slot allocated to VoIP frame 2 620, which VoIP frame 2 is then delayed for transmission on the next bandwidth slot. Notably, with this conventional approach, all subsequent VoIP frames, e.g., VoIP frame 3 621 are delayed by 20 msec. This delay increases each time the MS steals another bandwidth slot, and may lead to measurable loss in performance as the amount of delay approaches the maximum delay bucket (e.g., 50 msec).

Figure 7:
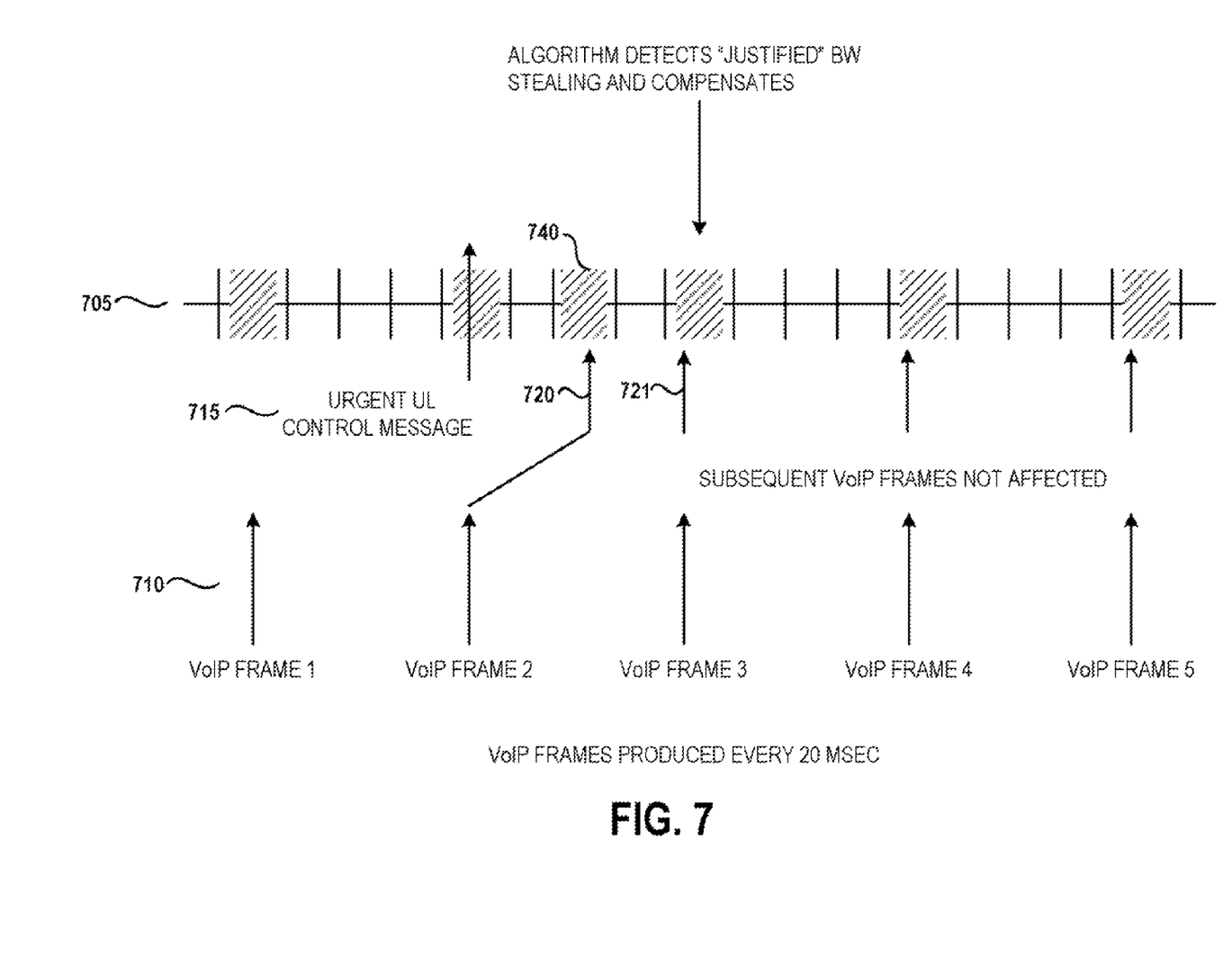
FIG. 7 provides another example of a real time flow for assigning uplink bandwidth with periodic and make-up bandwidth allocations for VoIP frames and with justified bandwidth stealing in accordance with one embodiment of the invention.

FIG. 7 illustrates one example of bandwidth compensation as provided by the embodiments described herein within the VoIP exchange. As with the illustrations of FIG. 5, the VoIP frames 710 are produced at a rate, which coincides with the uplink bandwidth allocation cycles (i.e., 20 msec) 705. The urgent control message 715 is assigned to the bandwidth cycle (or slot), which would have otherwise been allocated to VoIP frame 2 720. The scheduler responds by providing bandwidth compensation with an additional (or make-up) allocation 740 provided in between the regular sequence of allocations. The additional allocation is assigned to VoIP frame 2

720. Notably, VoIP frame 3 721 is not delayed by a 20 msec cycle, as with the conventional implementation (FIG. 6). Instead, the additional bandwidth is immediately allocated to enable the VoIP application to continue transmitting data (VoIP frame 2 720, and VoIP frame 3 721) without significant delays in the uplink transmission cycles. Thus, the subsequent VoIP frames are transmitted on the uplink cycle at which the frames were originally scheduled to be transmitted.

As illustrated by FIG. 7, the MS has one UGS connection established. The scheduler sends periodic uplink bandwidth grants to the MS, intended for uplink data. When the MS has an "urgent" uplink control message, the MS uses the uplink bandwidth to quickly send the message. The scheduler detects bandwidth compensation scenario and provides "make up" bandwidth to the MS.

The allocation of additional bandwidth due to bandwidth stealing is not taken into account when calculating the normal cycles of bandwidth allocation for the MS, and the subsequent uplink bandwidth allocations are completed according to the pre-set "normal" schedule. For example, if the control message was sent as part of an UGS grant, the scheduler will provide make-up bandwidth in a subsequent frame, but the timers that determine the time of the next normal periodic allocation will not be restarted.

The above embodiments enables the scheduler to support timely delivery of urgent uplink control messages while not imposing a penalty on the uplink data traffic performance. The features of the described embodiments are applicable to WiMAX, 802.16e Base Stations, and network elements and other similar communication devices that enable bandwidth stealing at the connected MS.

Generally, detecting when bandwidth stealing has occurred involves receiving a different type of information within the uplink bandwidth than a first information, which the uplink bandwidth was originally allocated to transmit. The scheduler then determines whether the different type information is one of a plurality of pre-established different types of information whose upload on the uplink bandwidth allocated for first information is justified. Following, the scheduler initiates an allocation of additional/make-up bandwidth when the different type information is one of the plurality of pre-established different types of information.

More specifically, the different type information refers to either the control messages or the type of connection (priority, level of load, etc.) as described herein. Also, the first type information refers to a first data associated with a first of several applications that may be communicating with the base station from the MS via one of the established connections. The first data is replaced with the different type information during bandwidth stealing activity.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. For example, while the present invention has been described with regard to cellular phones and cellular communication, it should be understood that at least some aspects of the present invention may be suited for use with any communication device and associated wireless audio receiving device is not limited to those devices described herein. In addition, many modifications may be made to adapt a particular system, device or component thereof to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
   detecting, by a scheduler, resource stealing within a received resource block;
   determining, by the scheduler, whether the resource stealing was justified;
   when resource stealing was justified, allocating, by the scheduler, additional resources to replace previously allocated resources that were stolen.

2. The method of claim 1, wherein:
   said detecting further comprises receiving a different type of information within the resource block than a first information the resource block was originally allocated to transmit;
   said determining comprises:
      determining whether the different type information is one of a plurality of pre-defined different types of information whose upload within the resource block allocated for first information is justified and evaluating whether resource compensation is desired to compensate for the resource stealing; and
   said allocating comprises initiating the automatic allocation of the additional resources when the different type information is one of the plurality of pre-defined different types of information and the resource compensation is desired.

3. The method of claim 2, wherein:
   said determining determines if one of an important sub-header and an extended sub-header is received within the resource block; and said allocating comprises, when at least one of the important sub-header and extended sub-header is received within the resource block and the resource compensation is desired, providing the additional resource allocation.

4. The method of claim 1, wherein the resource is uplink bandwidth allocated by a resource scheduler to a mobile station for communicating uplink data and wherein:
said detecting further comprises receiving a first-type message within an uplink bandwidth grant that was allocated to uplink data;
said determining comprises determining whether the first-type message is one of a plurality of pre-defined message types whose upload on the uplink bandwidth allocated for uplink data is justified and evaluating whether bandwidth compensation is desired to compensate for the bandwidth stealing; and
said allocating comprises initiating an allocation of the additional make-up bandwidth when the first-type message is one of the plurality of pre-established message types and bandwidth compensation is desired.

5. The method of claim 4, wherein the pre-defined message types include an urgent control message, from among (a) a MOB-SCN_REPORT and (b) a handover management message.

6. The method of claim 1, wherein said determining further comprises:
detecting a characteristic of the information received in the resource block that indicates an information type;
comparing the information type with a list of the pre-defined information types;
evaluating whether resource compensation is desired to compensate for the resource stealing; and
when a match is found within the list of pre-defined information types and resource compensation is desired, initiating the allocating to provide additional bandwidth to compensate for usage by a pre-defined information type of the resource block, wherein a total amount of resource allocated for normal resource usage is not reduced due to the resource stealing.

7. The method of claim 1, wherein allocating comprises:
determining an amount of resource that was stolen; and
evaluating whether the amount of resource stolen makes allocation of additional resource desirable; and
when additional resource is desirable, providing at least a same amount of additional make-up bandwidth during said allocating of additional resource.

8. The method of claim 1, further comprising providing, by the scheduler, a normal allocation of resources during subsequent scheduling of resource allocation that follows the allocation of the additional resource.

9. The method of claim 1, further comprising:
tagging, by the scheduler, the additional resource as a high priority allocation, wherein a receiving communication entity inserts the additional resource ahead of regularly scheduled resource allocations, such that first type information queued to utilize the stolen resource is not substantially delayed beyond a period of usage for resource that was justifiably stolen.

10. The method of claim 1, wherein said determining whether the resource stealing was justified comprises determining a current load of the system and evaluating whether resource compensation is desired to compensate for the resource stealing, and wherein said allocating additional resources comprises providing the additional resource allocation when the determining indicates the current load is low and resource compensation is desired.

11. The method of claim 1, wherein said determining whether the resource stealing was justified comprises determining a relative priority of a first stream of information from a second stream of information to which the bandwidth allocation is provided and evaluating whether resource compensation is desired to compensate for the resource stealing, and wherein said allocating additional resources comprises, when the first stream of information is a higher priority stream relative to the second stream of information and the first stream of information is received within the resource block and resource compensation is desired, providing the additional resource allocation, wherein resource stealing is pre-defined as justified when resource stealing occurs from low priority scheduling services to higher priority services.

12. The method of claim 1, wherein allocating comprises:
determining a ratio of a number of times resource stealing has occurred for a stream of information relative to a total number of received resource blocks and evaluating whether resource compensation is desired to compensate for the resource stealing; and
when the ratio is below a preset threshold ratio and resource compensation is desired, providing the additional resource allocation, wherein compensation for resource stealing by the stream is capped to not exceed the preset threshold ratio.

13. An apparatus that may adaptively be utilized within a base station of a wireless communication network with resource allocation to one or more mobile stations, said apparatus comprising a processor that implements the functionality described in claim 1.

14. A communication system comprising:
a processing component;
a mechanism for receiving information uploaded on an uplink bandwidth; and
a scheduler that is adapted to:
provide a regular allocation of uplink bandwidth for receiving information from a first connection established with a mobile station;
detect uplink bandwidth stealing within a received uplink bandwidth block;
determine whether the uplink bandwidth stealing was justified; and
when the uplink bandwidth stealing was justified, allocate additional make-up bandwidth to replace previously allocated bandwidth that was stolen.

15. The communication system of claim 14, wherein:
said detecting further comprises receiving a different type of information within the uplink bandwidth than the first information the uplink bandwidth was originally allocated to transmit;
said determining comprises:
determining whether the different type information is one of a plurality of pre-established different types of information whose upload on the uplink bandwidth allocated for first information is justified and, when the information is one of the pre-established different types of information, evaluating whether additional make-up bandwidth is desired to compensate for the bandwidth stealing; and
said allocating comprises initiating an allocation of the additional make-up bandwidth when the different type information is one of the plurality of pre-established different types of information and additional make-up bandwidth is desired to compensate for the bandwidth stealing.

16. The communication system of claim 14, wherein:
- said detecting further comprises receiving a first-type message within an uplink bandwidth grant that was allocated to uplink data;
- said determining comprises determining whether the first-type message is one of a plurality of pre-established message types whose upload on the uplink bandwidth allocated for uplink data is justified and evaluating whether bandwidth compensation is desired to compensate for the bandwidth stealing; and
- said allocating comprises initiating an allocation of the additional make-up bandwidth when the first-type message is one of the plurality of pre-established message types and bandwidth compensation is desired.

17. The communication system of claim 14, wherein said determining further comprises:
- detecting a characteristic of the first-type message that indicates a message type;
- comparing the message type with a list of the pre-established message types;
- evaluating whether bandwidth compensation is desired to compensate for the bandwidth stealing; and
- when a match is found within the list of pre-established message types and bandwidth compensation is desired, initiating the allocating to provide additional bandwidth to compensate for usage by the first-type message of the uplink bandwidth grant, wherein a total amount of bandwidth allocated for data uplink is not reduced due to the bandwidth stealing.

18. The communication system of claim 16, wherein the pre-established message types include at least one of:
- an urgent control message, from among (a) a MOB-SCN-_REPORT and (b) a handover management message;
- data other than the first data of a first connection among multiple supported connections, where the data is received when a current load of the system is low; and
- data other than the first data that is determined to have a relative priority that is higher than the priority of the second data to which the bandwidth allocation is provided, wherein bandwidth stealing is justified when bandwidth stealing occurs from low priority scheduling services to higher priority services; and
- data that is received with one of a pre-set important sub-header and an extended sub-header, wherein bandwidth stealing is justified when at least one of the pre-set important sub-header and extended sub-header is received within the upload bandwidth.

19. The communication system of claim 14, wherein the scheduler allocates by determining a ratio of a number of times resource stealing has occurred for the uplink bandwidth relative to a total number of received resource blocks, further evaluates if bandwidth compensation is desired to compensate for the bandwidth stealing and, when the ratio is below a preset threshold ratio and bandwidth compensation is desired, provides the additional resource allocation, wherein compensation for resource stealing is capped to not exceed the preset threshold ratio.

20. The communication system of claim 14, wherein said scheduler further is adapted to:
- determining an amount of uplink bandwidth that was stolen;
- providing at least a same amount of additional make-up bandwidth during said allocating; and
- providing a regular allocation of uplink bandwidth during subsequent scheduling of uplink bandwidth allocation that follows the allocation of the additional make-up bandwidth.

21. The communication system of claim 14, wherein said scheduler further is adapted to:
- tagging the additional make-up uplink bandwidth as a high priority allocation, wherein a receiving MS inserts the additional bandwidth ahead of regularly scheduled bandwidth allocations, such that uplink data queued for transmission is not substantially delayed beyond an uplink cycle that was justifiably stolen.

* * * * *